United States Patent
Eden et al.

(10) Patent No.: US 10,800,903 B2
(45) Date of Patent: Oct. 13, 2020

(54) FLAME-RETARDED TRANSPARENT POLYCARBONATE COMPOSITIONS

(71) Applicant: Bromine Compounds Ltd., Beer Sheva (IL)

(72) Inventors: Eyal Eden, Shoham (IL); Yaniv Hirschsohn, Rehovot (IL); Yelena Epshtein Assor, Beer Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 0 days.

(21) Appl. No.: 16/099,781

(22) PCT Filed: May 7, 2017

(86) PCT No.: PCT/IL2017/050501
§ 371 (c)(1),
(2) Date: Nov. 8, 2018

(87) PCT Pub. No.: WO2017/195189
PCT Pub. Date: Nov. 16, 2017

(65) Prior Publication Data
US 2019/0136013 A1 May 9, 2019

Related U.S. Application Data

(60) Provisional application No. 62/333,305, filed on May 8, 2016.

(51) Int. Cl.
| | | |
|---|---|---|
| *C08K 5/42* | (2006.01) | |
| *C08K 5/3492* | (2006.01) | |
| *C08J 3/22* | (2006.01) | |
| *C08G 64/00* | (2006.01) | |
| *C08K 5/00* | (2006.01) | |

(52) U.S. Cl.
CPC ............. *C08K 5/42* (2013.01); *C08G 64/00* (2013.01); *C08J 3/226* (2013.01); *C08K 5/3492* (2013.01); *C08K 5/0066* (2013.01); *C08K 2201/014* (2013.01)

(58) Field of Classification Search
CPC ................................ C08K 5/42; C08K 5/3492
See application file for complete search history.

(56) References Cited

U.S. PATENT DOCUMENTS

| | | |
|---|---|---|
| 4,486,560 A | 12/1984 | Thomas |
| 5,907,040 A | 5/1999 | Nishibori et al. |
| 5,965,731 A | 10/1999 | Ao et al. |
| 6,075,142 A | 6/2000 | Nishibori et al. |
| 2011/0098386 A1 | 4/2011 | Krauter et al. |
| 2011/0112226 A1 | 5/2011 | Rudiger et al. |

FOREIGN PATENT DOCUMENTS

| | | | |
|---|---|---|---|
| CN | 101657498 A | | 2/2010 |
| CN | 102002224 A | | 4/2011 |
| CN | 102234415 A | | 11/2011 |
| JP | 2010-235650 A | | 10/2010 |
| JP | 2012082403 A | * | 4/2012 |

OTHER PUBLICATIONS

Machine translation of JP-2012082403-A. (Year: 2012).*
International Search Report for PCT/IL2017/050501, dated Aug. 30, 2017 (4 pages).
Office Action issued in corresponding Chinese Application No. 201780028281.3, dated Mar. 25, 2020, with English translation of Search Report (10 pages).

* cited by examiner

*Primary Examiner* — Wenwen Cai
(74) *Attorney, Agent, or Firm* — Bookoff McAndrews, PLLC

(57) ABSTRACT

The invention provides a transparent polycarbonate composition comprising a polycarbonate resin and a mixture of flame retardants comprising (A) tris(2,4,6-tribromophenoxy)-s-triazine and (B) an aromatic sulphone sulphonate in the form of an alkali metal salt. The composition achieves a UL-94 flammability test rating of V-0 at a polycarbonate thickness equal to or less than 1.6 mm. Processes for preparing the composition are also disclosed.

19 Claims, No Drawings

FLAME-RETARDED TRANSPARENT POLYCARBONATE COMPOSITIONS

This application is a U.S. national stage filing under 35 U.S.C. § 371 of International Application No. PCT/IL2017/050501, filed on May 7, 2017, which claims the benefit of priority to U.S. Provisional Application No. 62/333,305, filed on May 9, 2016.

Polymers in commercial use contain additives, including flame retardants. The flammability characteristics of plastic materials are quantifiable according to a method specified by Underwriter Laboratories standard UL 94, where an open flame is applied to the lowermost edge of a vertically mounted test specimen made of the tested polymer formulation. The specimens used in the UL 94 test method vary in thickness (typical thicknesses are ~3.2 mm, ~1.6 mm, ~0.8 mm and ~0.4 mm). During the test, various features of the flammability of the test specimens are recorded. Then, according to the classification requirements, the tested polymer formulation is assigned with either V-0, V-1 or V-2 rating at the measured thickness of the test specimen. Polymer formulation assigned with the V-0 rating is the less flammable.

Polycarbonate is a transparent polymer possessing high impact strength which finds utility in a wide variety of applications such as laboratory safety shields, safety helmets, automotive parts, food containers and telephone and electronic parts. In general, many commercial grades of neat polycarbonate have intrinsic UL 94 V-2 rating.

An additive which has gained commercial acceptance in reducing the flammability of polycarbonate to reach UL 94 V-0 rating is the potassium salt of diphenyl sulphone sulphonate (abbreviated herein KSS), largely due to the fact that it does not affect the transparency of polycarbonate.

As pointed out above, the results of the flammability tests depend on the thickness of the material. KSS has been successfully used to achieve UL 94 V-0 rating in 1.6-3.2 mm thick specimens made of polycarbonate, either as the sole additive or with the aid of other additives, i.e., polymethylphenyl siloxane. However, experimental work conducted in support of this invention shows that KSS is less effective in reducing the flammability of polycarbonate products with smaller thickness, e.g., 0.8 mm thick polycarbonate specimens which are flame retarded with KSS do not pass the UL 94 V-0 test even upon increasing the loading of the flame retardant in the polymer.

It has been proposed in US 2011/0098386 to combine KSS with a brominated flame retardant in polycarbonate. One of the brominated flame retardants that are mentioned in US 2011/0098386 is tris(2,4,6-tribromophenoxy)-s-triazine:

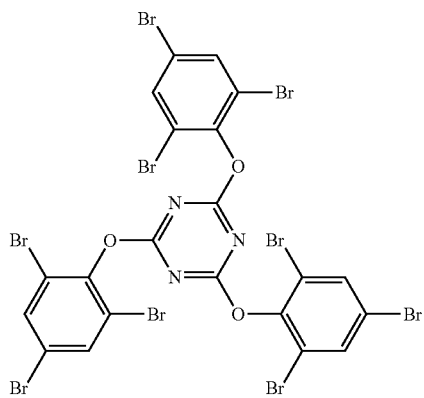 [SMILES: Brc1cc(Br)c(Oc2nc(Oc3c(Br)cc(Br)cc3Br)nc(Oc3c(Br)cc(Br)cc3Br)n2)c(Br)c1]

It is commercially available from ICL-IP as FR-245. The preparation of tris(2,4,6-tribromophenoxy)-s-triazine is generally based on a reaction of cyanuric chloride with 2,4,6-tribromophenolate under various conditions well known in the art (see, for example, U.S. Pat. Nos. 5,907,040, 5,965,731 and 6,075,142). Hereinafter, the compound is named FR-245.

The experimental work reported in US 2011/0098386 shows that mixtures consisting of KSS and FR-245—with the former being the predominant component of the mixture, e.g., 3:1 by weight mixtures—were tested for their efficacy in reducing the flammability of polycarbonate test specimens having thickness of 3.0 and 2.8 mm. The additives were employed in the form of a powder premix together with a small quantity of polycarbonate powder (to obtain 10 wt % of the total amount of the composition). The additives premix was then combined with the remaining amount of the polymer (90 wt %, in the form of polycarbonate pellets) and extruded in a co-rotating twin screw extruder.

It has now been found that mixtures consisting of FR-245 and KSS, characterized in that FR-245 is the predominant component of the mixture, e.g., mixtures proportioned such that the weight ratio FR-245:KSS is higher than 5:1 and preferably lies in the range from 5:1 to 30:1, can be incorporated into polycarbonate to achieve UL 94 V-0 rating in test specimens with thickness equal to or smaller than 1.6 mm, without adversely affecting the optical properties of the polymer. Polycarbonate transparent products which can benefit from the FR-245:KSS additive mixture can be found in home appliances, lightning, automotive & transportation, electrical devices, construction, electronics, IT and communication, medical & health-care devices. It is worth noting that addition of KSS along with other brominated flame retardants to polycarbonate resins leads to loss of transparency of the polymer, as shown by the experimental work reported below.

Another advantage of the aforementioned FR-245:KSS mixtures resides is their ability to form an extrudable mass suitable for the production of concentrates. That is, the mixtures of the invention can be combined at a relatively high proportion (e.g., >70% by weight) with polycarbonate carrier in an extruder to form concentrates useful as additive masterbatch in the compounding stage of polycarbonate.

The invention is primarily directed to a composition comprising polycarbonate resin and a mixture of flame retardants comprising (A) tris(2,4,6-tribromophenoxy)-s-triazine (FR-245) and (B) an aromatic sulphone sulphonate in the form of an alkali metal salt, e.g., the potassium salt of diphenyl sulphone sulphonate, characterized in that FR-245 is the major component of said mixture, for example, the weight ratio between FR-245 and the aromatic sulphone sulphonate salt is not less than 5:1, and that the concentration of said mixture is not less than 1% by weight based on the total weight of the polycarbonate composition, preferably not less than 5% by weight, e.g., from 5% to 20%, for example, 5%-15% or 5%-10%.

The composition according to the invention is transparent. For example, when tested according to ASTM D1746-97, light transmission of not less than 97%, e.g., not less than 98%, is recorded for the composition. The composition, when in a form of a test specimen having thickness (D)≤1.6 mm, e.g., D=0.8 mm or D=0.4 mm, achieves UL 94 V-0 flammability test rating.

The composition of the invention comprises not less than 70%, e.g., not less than 80%, preferably from 80% to 95% by weight, polycarbonate. The invention is not limited to any particular grade of polycarbonate. In its most general form, polycarbonate is characterized by a repeating unit —O—R—O—C(O)—, where R is the divalent radical corresponding to the dihydroxy compound employed in the polymerization reaction with the carbonate precursor. The reaction (e.g., where the carbonate precursor is phosgene) is well known. Relevant details concerning the synthetic methods can be found in US 2011/0098386 and references incorporated therein. The invention is of course especially directed to polycarbonate based on bisphenol, notably bisphenol A, which has gained commercial importance. Polycarbonate based on bisphenol A is generally a linear polymer but branched grades are also available on the market. The invention pertains to all polycarbonate grades (linear and branched). Commercial polycarbonate grades which are especially suitable for use in the invention have weight average molecular weight in the range from 10000 up to 100000. Preferred are polycarbonate grades with melt flow rate in the range from 2 to [grams/10 minutes], measured according to ISO 1133 (or ASTM D1238), such as Makrolon produced by Covestro or LEXAN produced by SABIC. More preferred are polycarbonate grades with melt flow rate in the range from 2 to 10 [grams/10 minutes], either linear or branched.

As mentioned above, tris(2,4,6-tribromophenoxy)-s-triazine for use in the invention is commercially available or can be made by the synthetic methods set forth above. An especially useful aromatic sulphone sulphonate metal salt for use in the invention is the aforementioned KSS (CAS number 63316-43-6):

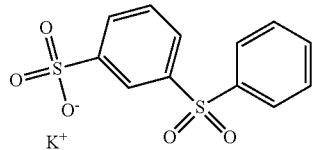 [SMILES: O=S(=O)([O-])c1cccc(S(=O)(=O)c2ccccc2)c1 ; [K+]]

which is available on the market from different manufacturers (Arichem LLC, KSS-FR®). Commercial products consist of a blend of the potassium salt of diphenyl sulphone mono- and disulphonate. The term "potassium salt of diphenyl sulphone sulphonate" as used herein is meant to include each individual component and their blend.

The weight ratio FR-245:KSS is preferably in the range from 5:1 to 30:1, more preferably from 10:1 to 25:1, and even more preferably from 15:1 to 20:1. For example, compositions comprising not less 70% by weight of polycarbonate (preferably not less than 80% or 85%), from 5 to 20% by weight of FR-245 (preferably 5 to 15%, e.g., 7 to 14%, for example 5 to 10%), and from 0.1 to 1.2% by weight KSS (preferably 0.1 to 0.6%) have been shown to possess the desired flammability and optical properties. More specifically, the following compositions are provided by the invention:

transparent compositions comprising not less 85% by weight of polycarbonate (e.g., from 85% to 93%), from 5 to 10% by weight of FR-245 and from 0.1 to 0.6% by weight KSS (e.g., 0.3 to 0.5%), achieving UL 94 V-0 rating at 1.6 mm (or 0.8 mm, especially for polycarbonate grades with melt flow rate in the range from 2 to 10 [grams/10 minutes], e.g., branched polycarbonate);

transparent compositions comprising not less than 80% by weight polycarbonate (e.g., from 80% to 85%), from 10 to 15% by weight of tris(2,4,6-tribromophenoxy)-s-triazine and from 0.1 to 1.0% by weight KSS (e.g., 0.1 to 0.6%), achieving UL 94 V-0 rating at 0.8 mm; and transparent compositions comprising not less than 75% by weight polycarbonate (e.g., from 75% to 80%), from 15 to 20% by weight of tris(2,4,6-tribromophenoxy)-s-triazine and from 0.1 to 1.0% by weight KSS achieving UL 94 V-0 rating at 0.4 mm.

Apart from polycarbonate and the flame retardants, the composition of this invention may further contain conventional additives, such as UV stabilizers (e.g., benzotriazole derivative), processing aids, antioxidants (e.g., hindered phenol type) and the like. The total concentration of these auxiliary additives is typically not more than 3% by weight.

Polycarbonate compositions of the invention are prepared employing different methods. For example, KSS may be introduced to the polycarbonate by the manufacturer with subsequent addition of tris(2,4,6-tribromophenoxy)-s-triazine by the compounder. Alternatively, both KSS and tris(2,4,6-tribromophenoxy)-s-triazine can be added by the compounder. The compounding of the polycarbonate compositions of the invention may be accomplished in different ways. For example, the ingredients (flame retardants in the form of powders, polycarbonate in a powder form or pelletized polycarbonate) can be fed successively into compounding equipment, such as a co-rotating twin-screw extruder. Alternatively, some or all of the ingredients of the composition may be premixed together, that is, they can be dry blended using suitable mixing machines, such as Henschel mixer, and the resulting mixture may then be charged to the compounding device. Process parameters such as barrel temperature, melt temperature and screw speed are as described in more detail in the examples that follow. The compounded pellets thus obtained are suitable for feed to an article shaping process such as injection molding, extrusion molding, compression molding, optionally followed by another shaping method. Accordingly, another aspect of the invention a process for preparing a polycarbonate composition with the properties described above, comprising processing a polycarbonate resin and a mixture of tris(2,4,6-tribromophenoxy)-s-triazine and an aromatic sulphone sulphonate metal salt, wherein said mixture is proportioned in the range from 5:1 to 30:1 (e.g., 10:1 to 25:1) in favor of tris(2,4,6-tribromophenoxy)-s-triazine.

In the compounding methods described above, the flame retardants of the invention were added to the extruder in a powder form, either separately or as a powder premix. Advantageously, a mixture consisting of FR-245 and KSS can be incorporated into polycarbonate resins in a form of a concentrate—also known as masterbatch. A masterbatch is a composition consisting of a suitable polymer carrier, and a relatively high proportion of the flame retardant(s).

Typically, the carrier is a polymer which is intended to facilitate the mixing of the masterbatch and improve the compatibility of the masterbatch and the blend polymer (the blend polymer is the polymer combined with the masterbatch; in the present case, the blend polymer is polycarbonate). Suitable carrier polymers applied in the masterbatch are therefore similar or identical with the blend polymer.

More specifically, the invention provides a masterbatch composition in the form of pellets, comprising:

(a) from 10 to 90% by weight of a polycarbonate carrier, e.g., from 15 to 75% by weight of a polycarbonate carrier, and more specifically from 18 to 40% of a polycarbonate carrier; and (b) from 10 to 85% by weight of a mixture consisting of FR-245 and an aromatic sulphone sulphonate metal salt, such as KSS, preferably from 30 to 80%, e.g., from 60 to 80%, wherein the mixture is proportioned in the range from 5:1 to 30:1, more preferably from 10:1 to 25:1, and even more preferably from 15:1 to 20:1, and c) optionally auxiliary additives. Percentage is based on the total weight of the concentrate composition.

The preferred total concentration of auxiliary additives that may be optionally present in the masterbatch is from 0.1 to 1%, based on the total weight of the masterbatch. As mentioned above, these auxiliary additives may be selected from the groups consisting of UV stabilizers (e.g., benzotriazole derivative), processing aids, antioxidants (e.g., hindered phenol type) and the like.

The masterbatch can be prepared by premixing the polymer carrier and a mixture consisting of the two flame-retarding agents, and compounding the resulting blend using extruders or other compounding equipment. If one of the components (e.g., the polycarbonate carrier) is provided in the form of pellets, and the other ingredients (e.g., FR-245) in the form of a powder, then pelletized and powdery components are fed separately to the extruder. The temperature profile in the extruder may be between 200 and 300° C. The extrudate is ultimately pelletized, affording the masterbatch in the form of cylinders with average diameter of 1-5 mm and length of 2-6, or spherical-like pellets with 1-5 mm diameter; the so-formed concentrate pellets are dust-free.

The masterbatch pellets allow a convenient route for incorporating the flame retardants into polycarbonate resin (it should be noted that the polycarbonate carrier used in the masterbatch and the polycarbonate blend polymer are not necessarily identical). The invention therefore provides a process for preparing a polycarbonate composition, comprising:

(i) providing masterbatch pellets consisting of
a) from 10 to 90% by weight of a polycarbonate carrier, e.g., from 15 to 75% by weight of a polycarbonate carrier, and more specifically from 18 to 40% of a polycarbonate carrier;
b) from 10 to 85% by weight of a mixture composed of FR-245 and an aromatic sulphone sulphonate metal salt, such as KSS, preferably from 30 to 80% by weight, e.g., from 60 to 80%, wherein the mixture is proportioned in the range from 5:1 to 30:1, more preferably from 10:1 to 25:1, and even more preferably from 15:1 to 20:1,
c) optionally auxiliary additives; and
(ii) processing (e.g., by injection molding) said masterbatch pellets with a polycarbonate resin.

Another aspect of the invention is a method for reducing the flammability and retaining transparency of polycarbonate formulations containing from 0.1 to 1.2% by weight sulfonate salt, specifically from 0.1 to 0.6% KSS, comprising adding from about 5 to 20% by weight relative to the weight of the composition of tris(2,4,6-tribromophenoxy)-s-triazine (preferably from 5 to 15%, e.g., 5 to 10%), to meet UL 94 V-0 test requirements at 1.6 mm, 0.8 mm or 0.4 mm thickness. The use of tris(2,4,6-tribromophenoxy)-s-triazine at 5 to 20% additive level (preferably 5 to 15%, e.g., 5 to 10%), in combination with KSS, to provide transparent polycarbonate formulations that are UL 94 V-0 rated at 1.6 mm, 0.8 mm or 0.4 mm polycarbonate thickness is yet another aspect of the invention. In particular, polycarbonate grades which benefit from the invention have melt flow rate in the range from 2 to 10 [grams/10 minutes], either linear or branched.

Articles that can be produced from the polycarbonate formulations of the invention includes products found in home appliances, lightning, automotive & transportation, electrical devices, construction, electronics, IT and communication, medical & health-care devices. Such articles constitute another aspect of the invention.

EXAMPLES

Ingredients of the Compositions

The materials used for preparing the polycarbonate formulations are tabulated in Table 1 (FR is the abbreviation of flame retardant):

TABLE 1

| Component (manufacturer) | GENERAL DESCRIPTION | FUNCTION |
|---|---|---|
| PC Makrolon 3106 (Bayer) | Polycarbonate (MFI = 6.5 g/10 min) | Plastic matrix |
| KSS-FR ® (Arichem) | Potassium salt of a complex of diphenyl sulfone sulfonate and diphenyl sulfonedisulfonate | FR |
| FR-245 (ICL-IP) | Tris(2,4,6-tribromophenoxy)triazine | Brominated FR |
| FR-1410 (ICL-IP) | Decabromodiphenyl ethane | Brominated FR |
| FR-1025 (ICL-IP) | poly (pentabromobenzyl acrylate) | Brominated FR |
| F-2400 (ICL-IP) | Brominated epoxy resin molecular weight ~40,000-60,000 | Brominated FR |
| FR-803 P (ICL-IP) | Brominated polystyrene | Brominated FR |
| Irganox B 225 (BASF) | Antioxidant/processing stabilizer blend Ratio Irganox 1010:Irgafos 168 = 1:1 | Antioxidant & heat stabilizer. |

Flammability Test

The flammability test was carried out according to the Underwriters-Laboratories standard UL 94, applying the vertical burn on specimens of 1.6 mm, 0.8 mm or 0.4 mm thickness.

Optical Properties

The instrument used was Datacolor C600. Transparency was measured according to ASTM D1746 97 and haze according to ASTM D1003 standard test methods. Yellowness index: D1925-70.

Examples 1-2 (Comparative) and 3 (of the Invention)

Flame Retarded Transparent Polycarbonate Compositions (Compounding Accomplished Through Powder Addition)

In this set of examples, KSS and FR-245 were tested for their ability to reduce the flammability of polycarbonate test specimens with thickness of 1.6 mm and 0.8 mm. Additives were fed to the extruder in a powder form. KSS and FR-245 were used separately in the compositions illustrated in Examples 1 and 2, respectively, whereas in the composition of Example 3, they were used together. The compositions and their properties are described in Table 3 below.

To prepare the compositions, polycarbonate pellets (Makrolon 3106 pellets) and additives (additives are applied as powders) were fed into a twin-screw co-rotating extruder ZE25 with L/D=32 through its main feeding port. The operating parameters of the extruder were as follows:

Barrel temperature (from feed end to discharge end): 160° C., 180° C., 220° C., 250° C., 250° C., 260° C., 270° C., die −275° C.

Screw rotation speed: 350 rpm

Feeding rate: 12 kg/hour.

The strands produced were pelletized in a pelletizer 750/3 from Accrapak Systems Ltd. The resultant pellets were dried in a circulating air oven at 120° C. for 3 hours. The dried pellets were injection molded into test specimens using Allrounder 500-150 from Arburg under the conditions tabulated below:

TABLE 2

| PARAMETER | Set values |
| --- | --- |
| $T_1$ (Feeding zone) | 270° C. |
| $T_2$ | 280° C. |
| $T_3$ | 290° C. |
| $T_4$ | 295° C. |
| $T_5$ (nozzle) | 300° C. |
| Mold temperature | 90° C. |
| Injection pressure | 1500 bar |
| Holding pressure | 1000 bar |
| Back pressure | 80 bar |
| Holding time | 10 s |
| Cooling time | 15 s |
| Mold closing force | 500 kN |
| Filling volume (portion) | 35 ccm |
| Injection speed | 25 ccm/sec |

Specimens of 1.6 mm and 0.8 mm thickness were prepared. The test specimens were conditioned for one week at 23° C., and were then subjected to the several tests to determine their properties. The compositions tested and the results are set out in Table 3.

TABLE 3

| | Example | | |
| --- | --- | --- | --- |
| | Example 1 (comparative) | Example 2 (comparative) | Example 3 (of the invention) |
| Composition, wt % | | | |
| polycarbonate | 99.4 | 89.4 | 91.9 |
| KSS | 0.4 | | 0.4 |
| FR-245 | | 10.4 | 7.5 |
| Irganox B-225 | 0.2 | 0.2 | 0.2 |
| Bromine content (calculated wt %) | 0 | 7 | 5 |
| Properties Flammability | | | |
| UL 94V 1.6 mm | V-2 | V-2 | V-0 |
| UL 94V 0.8 mm | V-2 | V-2 | V-0 |
| Optical properties | | | |
| Transparency % | 99.0 | 99.0 | 98.9 |
| Haze | 1.0 | 0.9 | 1.1 |

The results set out in Table 3 indicate the high efficacy of a combination consisting of FR-245 and KSS in reducing the flammability of low-thickness polycarbonate test specimens, achieving UL 94 V-0 rating while preserving the transparency of the polymer. It is worth noting that the transparency of the neat polycarbonate was 98.1%.

Example 4 and 6-9 (Comparative) and 5A-5B (of the Invention)

Preparation of Flame Retardant Concentrates

In this set of Examples, KSS-FR® was compounded in a twin-screw extruder to form concentrate pellets with polycarbonate carrier. KSS-FR® was used either as a sole flame retardant (Example 4) or together with a brominated flame retardant (Examples 5A, 5B and 6 to 9). To prepare the concentrate pellets, polycarbonate pellets (Makrolon® 3106 pellets) and additives (premixed in a powder form) were fed into a twin-screw co-rotating extruder ZE25 with L/D=32 through its main feeding port. The operating parameters of the extruder were as follows:

Barrel temperature (from feed end to discharge end): 160° C., 180° C., 220° C., 250° C., 250° C., 260° C., 270° C., die –275° C.

Screw rotation speed: 350 rpm.

Feeding rate was 12 kg/hour.

The strands produced were solidified, and pelletized in pelletizer 750/3 (Accrapak Systems Ltd), to afford cylindrical pellets with average diameter of 1-5 mm and length of 2-6 mm. The compositions of the so-formed masterbatch pellets (MB) are presented in Table 4.

TABLE 4

| | Example | | | | | | |
| --- | --- | --- | --- | --- | --- | --- | --- |
| | 4 | 5A | 5B | 6 | 7 | 8 | 9 |
| | MB 4 | MB 5A | MB 5B | MB 6 | MB 7 | MB 8 | MB 9 |
| PC | 84.8 | 26.65 | 29.8 | 29.8 | 29.8 | 29.8 | 29.8 |
| KSS | 15.0 | 6.65 | 3.5 | 3.5 | 3.5 | 3.5 | 3.5 |
| FR-245 | | 66.5 | 66.5 | | | | |
| FR-1410 | | | | 66.5 | | | |
| F-2400 | | | | | 66.5 | | |
| FR-1025 | | | | | | 66.5 | |
| FR-803 P | | | | | | | 66.5 |
| Irganox 225 | 0.2 | 0.2 | 0.2 | 0.2 | 0.2 | 0.2 | 0.2 |

It should be noted that it was difficult to prepare the masterbatch of Example 4, containing 15 wt % KSS, due to the tendency of KSS to adhere to the internal surfaces of the hopper. Other masterbatch compositions (MB 5A, MB 5B and MB 6 to MB 9), with lower amounts of KSS, were extruded fairly easily.

In the next sets of Examples, the masterbatch pellets of Examples 4, 5A, 5B and 6 to 9 were incorporated into polycarbonate (the same polycarbonate grade used for the production of the masterbatch pellets). The masterbatch pellets were mixed with polycarbonate pellets and injection-molded into 1.6 mm thick test specimens (Example 10 to 16), 0.8 mm thick test specimens (Examples 17 to 22) and 0.4 mm thick test (Examples 23-24) specimens according to the conditions set out in Examples 1 to 3—injection parameters are found in Table 2. The results of the tests (flammability and optical properties) are presented below.

Examples 10, 13-16 (Comparative) and 11-12 (of the Invention)

Flame Retarded Transparent Polycarbonate Compositions Prepared Via Masterbatch Route (1.6 mm Thick Test Specimens)

Compositions and properties of the so-formed polycarbonate test specimens are presented in Table 5. The polycarbonate and the masterbatch were combined at 80:20 weight ratio.

TABLE 5

| | Example | | | | | | |
|---|---|---|---|---|---|---|---|
| | 10 MB 4 (KSS) | 11 MB 5A (FR245:KSS) 10:1 | 12 MB 5B (FR245:KSS) 19:1 | 13 MB 6 (FR1410:KSS) | 14 MB 7 (FR2400:KSS) | 15 MB 8 (FR1025:KSS) | 16 MB 9 (FR803:KSS) |
| composition | | | | | | | |
| polycarbonate | 80 | 80 | 80 | 80 | 80 | 80 | 80 |
| MB | 20 | 20 | 20 | 20 | 20 | 20 | 20 |
| Properties Flammability, UL 94 1.6 mm thickness | | | | | | | |
| Maximum flaming time, sec | 3 | 3 | 6 | 3 | 6 | 7 | 3 |
| Total flaming time, sec | 17 | 13 | 25 | 12 | 30 | 32 | 16 |
| Maximal glow time + second flaming | 10 | 0 | 0 | 0 | 0 | 0 | 0 |
| Number of specimen dripping | 5 | 1 | 2 | 2 | 5 | 1 | 0 |
| Number of specimen igniting cotton | 5 | 0 | 0 | 0 | 2 | 0 | 0 |
| Rating | V-2 | V-0 | V-0 | V-0 | V-2 | V-0 | V-0 |
| Optical properties | | | | | | | |
| Appearance* | ✓ | ✓ | ✓ | opaque | opaque | opaque | opaque |
| Transparency, % | 97.73 | 98.58 | 98.6 | | | | |
| Haze | 2.8 | 1.5 | 1.4 | | | | |
| Yellow Index | 18.49 | 7.72 | 5.72 | | | | |

*✓ indicates transparent formulation by visual inspection.

The following conclusions can be drawn from the data tabulated in Table 5:

MB 4 should be rejected for the reason that the flammability of the polymer is not satisfactory.

MB 6, MB 7, MB 8 and MB 9 are unacceptable due to loss of transparency.

MB 7 is to be eliminated on account of both factors, that is, loss of transparency and unsatisfactory flammability behavior.

MB 5A and MB 5B clearly emerge as excellent FR additives.

Another trend shown by results tabulated in Table 5 is a slight drop in the optical properties of transparent polycarbonates upon increase of the concentration of KSS in the polymer (see Example 10 with content of 3% by weight KSS, in comparison with Examples 11 and 12, with −1% by weight KSS).

Examples 17, 21-23 (Comparative) and 18-20 (of the Invention)

Flame Retarded Transparent Polycarbonate Compositions Prepared Via Masterbatch Route (0.8 mm Thick Test Specimens)

Compositions and properties of the 0.8 mm thick polycarbonate test specimens are presented in Table 6. For the sake of comparison, masterbatch pellets which were rejected in view of the results reported in Examples 10 to 16 were subjected to UL 94 V-0 0.8 mm test. The results are tabulated in Table 6.

TABLE 6

| | Example | | | | | | |
|---|---|---|---|---|---|---|---|
| | 17 MB 4 (KSS) | 18 MB 5A (FR245:KSS) 10:1 | 19 MB 5B (FR245:KSS) 19:1 | 20 MB 5B (FR245:KSS) 19:1 | 21 MB 6 (FR1410:KSS) | 22 MB 8 (FR1025:KSS) | 23 MB 9 (FR803:KSS) |
| Composition | | | | | | | |
| polycarbonate | 80 | 80 | 85 | 80 | 80 | 80 | 80 |
| MB | 20 | 20 | 15 | 20 | 20 | 20 | 20 |
| Properties Flammability, UL 94 0.8 mm thickness | | | | | | | |
| Maximum flaming time, sec | 7 | 5 | 5 | 1 | 2 | 2 | 5 |
| Total flaming time, sec | 30 | 23 | 23 | 10 | 12 | 13 | 23 |

TABLE 6-continued

| | Example | | | | | | |
|---|---|---|---|---|---|---|---|
| | 17<br>MB 4<br>(KSS) | 18<br>MB 5A<br>(FR245:KSS)<br>10:1 | 19<br>MB 5B<br>(FR245:KSS)<br>19:1 | 20<br>MB 5B<br>(FR245:KSS)<br>19:1 | 21<br>MB 6<br>(FR1410:KSS) | 22<br>MB 8<br>(FR1025:KSS) | 23<br>MB 9<br>(FR803:KSS) |
| Maximal glow time + second flaming | 0 | 0 | 0 | 0 | 0 | 0 | 0 |
| Number of specimen dripping | 5 | 3 | 5 | 0 | 5 | 4 | 0 |
| Number of specimen igniting cotton | 4 | 0 | 0 | 0 | 0 | 2 | 0 |
| Rating | V-2 | V-0 | V-0 | V-0 | V-0 | V-2 | V-0 |

It is seen that MB 5A and MB 5B can be compounded with polycarbonate to form transparent, UL 94 V-0 0.8 mm rated compositions. In particular, MB 5B achieves the these goals at a fairly low loading (15 wt %).

Examples 23 (Comparative) and 24 (of the Invention)

Flame Retarded Polycarbonate Compositions Prepared Via Masterbatch Route (0.4 mm Thick Test Specimens)

MB 5B (based on FR245/KSS mixture with 19:1 weight ratio), which has emerged as the most efficient flame retardant in the tests reported above, was compounded with polycarbonate at 70:30 weight to form 0.4 mm thick polycarbonate test specimens. For the purpose of comparison, MB 4 was also tested. Compositions and properties of the 0.4 mm thick polycarbonate test specimens are presented in Table 7.

TABLE 7

| | Example | |
|---|---|---|
| | 23<br>MB 4<br>(KSS) | 24<br>MB 5B<br>(FR245:KSS)<br>19:1 |
| Composition (wt %) | | |
| polycarbonate | 70 | 70 |
| MB | 30 | 30 |
| Properties<br>Flammability, UL 94 0.4 mm thickness | | |
| Maximum flaming time, sec | 10 | 3 |
| Total flaming time, sec | 40 | 13 |
| Maximal glow time + second flaming | 9 | 0 |
| Number of specimen dripping | 4 | 3 |
| Number of specimen igniting cotton | 3 | 0 |
| Rating | V-2 | V-0 |

Examples 25 and 26 (Both Comparative)

Flame Retarded Polycarbonate Compositions

A mixture consisting of KSS-FR® and FR-245 in 10:1 weight ratio (in favor of KSS-FR®) was produced in a concentrate form with polycarbonate carrier. The intention was to prepare a concentrate with the following composition by feeding the flame retardants in a powder form to the extruder:

Polycarbonate carrier: 77.8% by weight

KSS-FR®: 20% by weight

FR-245: 2% by weight

Irganox B225: 0.2% by weight.

However, powder addition of KSS-FR® to the extruder met with difficulties due to the tendency of the material to cling to the internal walls of the hopper. The concentrate was therefore produced with the aid of previously prepared concentrates (MB 4 and MB 5A—see Table 4 above), which were appropriately proportioned to achieve the 10:1 weight ratio in favor of KSS-FR®. The extrudate was solidified and pelletized according to the conditions described in Examples 4 to 9 to produce masterbatch pellets (hereinafter named MB 10).

Polycarbonate pellets and MB 10 pellets were processed to form 80:20 and 70:30 weight ratio compositions. 0.8 mm thick test specimens were produced by injection molding using the general procedure described above. The optical and flammability properties were measured. The compositions were found to be transparent, with % transmission of 97.88; haze of 2.5 and Yellowness index of 12.82. However, the results of the flammability tests were unsatisfactory, as shown by Table 8.

TABLE 8

| | Example | |
|---|---|---|
| | 25 | 26 |
| composition | | |
| polycarbonate | 80 | 70 |
| MB 10 (KSS:FR-245 at 10:1 weight ratio) | 20 | 30 |
| Properties<br>Flammability, UL 94 0.8 mm thickness | | |
| Maximum flaming time, sec | 8 | 12 |
| Total flaming time, sec | 34 | 24 |
| Maximal glow time + second flaming | 5 | 0 |
| Number of specimen dripping | 5 | 5 |
| Number of specimen igniting cotton | 2 | 2 |
| Rating | V-2 | V-2 |

Examples 27 (Reference) and 28 (of the Invention)

Cone Calorimeter Analysis of Flame Retarded Polycarbonate Compositions

Behavior of plastic materials in fire can also be studied with the aid of a cone calorimeter, where a radiant heat is projected onto a sample before ignition and during burning of the sample, and several parameters are measured. Data was collected by the cone calorimeter (Stanton Redcroft, according to ISO 5660-1; injection molded plaques were tested, having dimensions of 100 mm×75 mm×3.2 mm) under a heat flux of 50 kW/m$^2$. The parameters set out in Table 9 include time to ignition (TTI), average heat release rate, peak heat release rate (PHRR), total heat release, smoke (SEA), smoke parameter (calculated) and fire performance index (calculated).

TABLE 9

|  | Example | |
|---|---|---|
|  | Example 27 (reference) | Example 28 |
| composition | | |
| polycarbonate | 100 | 91.9 |
| KSS |  | 0.4 |
| FR-245 |  | 7.5 |
| Irganox B-225 |  | 0.2 |
| Bromine content (calculated wt %) |  | 5 |
| Flammability test based on cone calorimeter | | |
| Time to ignition (s) | 75 | 61 |
| average heat release rate (kW/m$^2$) | 215 | 177 |
| peak heat release rate (kW/m$^2$) | 623 | 347 |
| total heat release rate (mJ/m$^2$) | 66.4 | 51.2 |
| Smoke (m$^2$/kg) | 852 | 1219 |
| Smoke parameter (pHRRR•SEA · 10$^{-3}$) | 532 | 423 |
| Fire performance index (TTI/PHRR) | 0.12 | 0.17 |

The cone calorimeter study shows that a combination consisting of KSS and tris(2,4,6-tribromophenoxy)-s-triazine, used at ~8% additive level, greatly improves the fire behavior of transparent polycarbonate formulations, seeing the reduced smoke parameter and the better (higher) fire performance index.

The invention claimed is:

1. A polycarbonate composition comprising a polycarbonate resin and a mixture of flame retardants comprising
    (A) tris(2,4,6-tribromophenoxy)-s-triazine; and
    (B) an aromatic sulphone sulphonate in the form of an alkali metal salt,
    characterized in that the weight ratio between said tris(2,4,6-tribromophenoxy)-s-triazine and said aromatic sulphone sulphonate salt is not less than 5:1 and the concentration of said mixture of flame retardants is not less than 5% by weight based on the total weight of the composition, said composition being further characterized in that it is transparent and in that it achieves a UL-94 flammability test rating of V-0 at a thickness equal to or less than 0.8 mm.

2. The polycarbonate composition according to claim 1, wherein the aromatic sulphone sulphonate is potassium salt of diphenyl sulphone sulphonate (KSS).

3. The polycarbonate composition according to claim 2, comprising not less than 70% by weight polycarbonate, from 5 to 20% by weight of tris(2,4,6-tribromophenoxy)-s-triazine and from 0.1 to 1.2% by weight KSS.

4. The polycarbonate composition according to claim 3, comprising from 5 to 15% tris(2,4,6-tribromophenoxy)-s-triazine and from 0.1 to 0.6% by weight potassium salt of diphenyl sulphone sulphonate (KSS).

5. The polycarbonate composition according to claim 4, comprising from 5 to 10% tris(2,4,6-tribromophenoxy)-s-triazine.

6. The polycarbonate composition according claim 1, exhibiting light transmission of not less than 97% as determined by ASTM D1746-97.

7. The polycarbonate composition according to claim 1, wherein the polycarbonate resin has melt flow rate in the range from 2 to 10 [grams/10 minutes].

8. A process for preparing the polycarbonate composition as defined in claim 1, comprising processing a polycarbonate resin and a mixture of tris(2,4,6-tribromophenoxy)-s-triazine and an aromatic sulphone sulphonate metal salt, wherein said mixture is proportioned in the range from 5:1 to 30:1 in favor of tris(2, 4, 6-tribromophenoxy)-s-triazine.

9. The process according to claim 8, wherein the mixture of tris (2,4,6-tribromophenoxy)-s-triazine and the aromatic sulphone sulphonate metal salt is provided in a concentrate (masterbatch) form.

10. The process according to claim 8, wherein the aromatic sulphone sulphonate is potassium salt of diphenyl sulphone sulphonate (KSS).

11. The process according to claim 10, comprising:
    (i) providing masterbatch pellets comprising
        a) from 15 to 75% by weight of a polycarbonate carrier, and
        b) from 30 to 80% by weight of a mixture composed of tris (2,4,6-tribromophenoxy)-s-triazine and KSS, wherein the mixture is proportioned in a range from 10:1 to 25:1 in favor of tris (2,4,6-tribromophenoxy)-s-triazine, and
    (ii) processing said masterbatch pellets with the polycarbonate resin.

12. The process according to claim 10, comprising:
    (i) providing masterbatch pellets comprising
        a) from 18 to 40% by weight of a polycarbonate carrier; and
        b) from 60 to 80% by weight a mixture composed of tris (2,4,6-tribromophenoxy)-s-triazine and KSS, wherein the mixture is proportioned in a range from 10:1 to 25:1, and
    (ii) processing said masterbatch pellets with the polycarbonate resin.

13. The process according to claim 11, wherein the masterbatch pellets further comprise at least one auxiliary additive.

14. The process according to claim 12, wherein the masterbatch pellets further comprise at least one auxiliary additive.

15. Concentrate pellets comprising:
    a) from 15 to 75% by weight of a polycarbonate carrier, and
    b) from 30 to 80% by weight of a mixture composed of tris (2,4,6-tribromophenoxy)-s-triazine and potassium salt of diphenyl sulphone sulphonate (KSS), wherein the mixture is proportioned in a range from 10:1 to 25:1 in favor of tris(2,4,6-tribromophenoxy)-s-triazine.

16. Concentrate pellets comprising:
    a) from 18 to 40% of a polycarbonate carrier; and
    b) from 60 to 80% by weight a mixture composed of tris (2,4,6- tribromophenoxy)-s-triazine and potassium salt of diphenyl sulphone sulphonate (KSS), wherein the mixture is proportioned in a range from 10:1 to 25:1.

17. The concentrate pellets according to claim 15, wherein the concentrate pellets further comprise at least one auxiliary additive.

18. A method for reducing the flammability and retaining transparency of polycarbonate formulations containing from 0.1 to 1.2% by weight sulfonate salt, comprising adding 5 to 15% by weight, relative to the weight of the composition, of tris (2, 4, 6-tribromophenoxy)-s-triazine, to meet UL 94 V-0 test requirements at 0.8 mm.

19. An article formed from the composition of claim 1.

* * * * *